(12) United States Patent
Hazel et al.

(10) Patent No.: US 11,555,452 B1
(45) Date of Patent: Jan. 17, 2023

(54) CERAMIC COMPONENT HAVING SILICON LAYER AND BARRIER LAYER

(71) Applicant: RAYTHEON TECHNOLOGIES CORPORATION, Farmington, CT (US)

(72) Inventors: Brian T. Hazel, Avon, CT (US); Raymond Surace, Newington, CT (US); Robert A. White, III, Meriden, CT (US); Zhongfen Ding, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/378,005

(22) Filed: Jul. 16, 2021

(51) Int. Cl.
*F02C 7/28* (2006.01)
*F02C 3/04* (2006.01)
*C23C 4/134* (2016.01)
*C23C 4/11* (2016.01)
*C23C 4/18* (2006.01)

(52) U.S. Cl.
CPC ............... *F02C 7/28* (2013.01); *F02C 3/04* (2013.01); *C23C 4/11* (2016.01); *C23C 4/134* (2016.01); *C23C 4/18* (2013.01); *F05D 2220/32* (2013.01); *F05D 2240/35* (2013.01); *F05D 2300/611* (2013.01)

(58) Field of Classification Search
CPC ..... F02C 7/28; F02C 3/04; F16J 15/16; C23C 4/11; C23C 4/134; C23C 4/18; F05D 2220/32; F05D 2240/35; F05D 2300/611
See application file for complete search history.

(56) References Cited

U.S. PATENT DOCUMENTS

| | | | | |
|---|---|---|---|---|
| 5,391,404 A | * | 2/1995 | Lee | C04B 41/87 427/452 |
| 6,335,105 B1 | * | 1/2002 | McKee | C04B 37/025 427/419.7 |
| 6,517,960 B1 | | 2/2003 | Wang | |
| 7,138,183 B2 | | 11/2006 | Hisamatsu et al. | |
| 8,124,252 B2 | * | 2/2012 | Cybulsky | C23C 30/00 428/701 |
| 9,598,777 B2 | | 3/2017 | Lee | |
| 9,920,656 B2 | | 3/2018 | Landwehr et al. | |

(Continued)

*Primary Examiner* — Jesse S Bogue

(74) *Attorney, Agent, or Firm* — Carlson, Gaskey & Olds, P.C.

(57) ABSTRACT

A seal system includes a ceramic component, a metallic component, a coating system. The ceramic component has a first surface region that defines a first surface roughness. The metallic component is situated adjacent to the first surface region and has a second surface region facing the first surface region. The coating system includes a silicon-containing layer on the surface region of the ceramic component and barrier layer on the silicon-containing layer. The silicon containing layer has a surface in contact with the barrier layer and the barrier layer has a surface in contact with the metallic component. The surface of the barrier layer has a second surface roughness that is less than the first surface roughness. The barrier layer serves to limit interaction between silicon of the silicon-containing layer and elements of the metallic component. The barrier layer includes at least one of mullite, zircon, or hafnon.

14 Claims, 2 Drawing Sheets

(56) References Cited

U.S. PATENT DOCUMENTS

| | | |
|---|---|---|
| 10,280,770 B2 | 5/2019 | Shim et al. |
| 10,294,802 B2 | 5/2019 | Shi et al. |
| 10,717,678 B2 | 7/2020 | Lee |
| 2006/0188736 A1* | 8/2006 | Luthra ................ C04B 41/4527 428/472 |
| 2009/0162632 A1* | 6/2009 | Kirby .................. C04B 41/5024 428/448 |
| 2010/0158680 A1* | 6/2010 | Kirby ...................... F01D 5/288 423/328.1 |
| 2010/0255260 A1* | 10/2010 | Lee ......................... C04B 41/52 428/164 |
| 2018/0371600 A1* | 12/2018 | Li ............................ C23C 4/04 |
| 2019/0085707 A1* | 3/2019 | Xu .......................... F01D 11/08 |

* cited by examiner

CERAMIC COMPONENT HAVING SILICON LAYER AND BARRIER LAYER

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature gas flow. The high-pressure and temperature gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in gas turbine engine systems.

SUMMARY

A seal system according to an example of the present disclosure includes a ceramic component that has a surface region defining a first surface roughness, a metallic component situated adjacent the surface region, and a coating system disposed on the surface region. The coating system includes a silicon-containing layer on the surface region and a barrier layer on the silicon-containing layer that is in contact with the metallic component. The silicon-containing layer has a surface in contact with the barrier layer. The barrier layer has a surface in contact with the metallic component. The surface of the barrier layer has a second surface roughness that is less than the first surface roughness. The barrier layer limits interaction between silicon of the silicon-containing layer and elements of the metallic component. The barrier layer includes at least one of mullite, zircon, or hafnon.

In a further embodiment of any of the foregoing embodiments, the barrier layer is selected from the group consisting of mullite, zircon, and hafnon, and the metallic component is a nickel- or cobalt-based superalloy.

In a further embodiment of any of the foregoing embodiments, the barrier layer is mullite.

In a further embodiment of any of the foregoing embodiments, the barrier layer is zircon.

In a further embodiment of any of the foregoing embodiments, the barrier layer is hafnon.

In a further embodiment of any of the foregoing embodiments, the silicon-containing layer is silicon.

A gas turbine engine according to an example of the present disclosure includes a compressor section, a combustor in fluid communication with the compressor section, a turbine section in fluid communication with the combustor, and at least one sealing system in the turbine section. The sealing system includes a ceramic component having a surface region defining a first surface roughness, a metallic component situated adjacent the surface region, and a coating system disposed on the surface region. The coating system includes a silicon-containing layer on the surface region and a barrier layer on the silicon-containing layer. The silicon-containing layer has a surface in contact with the barrier layer. The barrier layer has a surface in contact with the metallic component. The surface of the barrier layer has a second surface roughness that is less than the first surface roughness. The barrier layer limits interaction between silicon of the silicon-containing layer and elements of the metallic component. The barrier layer includes at least one of mullite, zircon, or hafnon.

In a further embodiment of any of the foregoing embodiments, the barrier layer is selected from the group consisting of mullite, zircon, and hafnon, and the metallic component is a nickel- or cobalt-based superalloy.

In a further embodiment of any of the foregoing embodiments, the barrier layer is mullite.

In a further embodiment of any of the foregoing embodiments, the barrier layer is zircon.

In a further embodiment of any of the foregoing embodiments, the barrier layer is hafnon.

In a further embodiment of any of the foregoing embodiments, the silicon-containing layer is silicon.

A seal system according to an example of the present disclosure includes a ceramic component that has a non-core-gaspath surface region defining a first surface roughness and a core gaspath surface region, a metallic component situated adjacent the non-core-gaspath surface region, and a coating system disposed on the ceramic component. The coating system includes a silicon-containing layer on the non-core-gaspath surface region, and a barrier layer that has a first section on the silicon-containing layer and a second section on the core-gaspath region and that is connected to the first section. The first section is in contact with the metallic component and the second section serves as an environmental barrier on the core-gaspath region.

In a further embodiment of any of the foregoing embodiments, the barrier layer is selected from the group consisting of mullite, zircon, and hafnon.

In a further embodiment of any of the foregoing embodiments, the barrier layer is mullite.

In a further embodiment of any of the foregoing embodiments, the barrier layer is zircon.

In a further embodiment of any of the foregoing embodiments, the barrier layer is hafnon.

In a further embodiment of any of the foregoing embodiments, the barrier layer limits the interaction between silicon of the silicon containing layer and elements of the metallic component.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
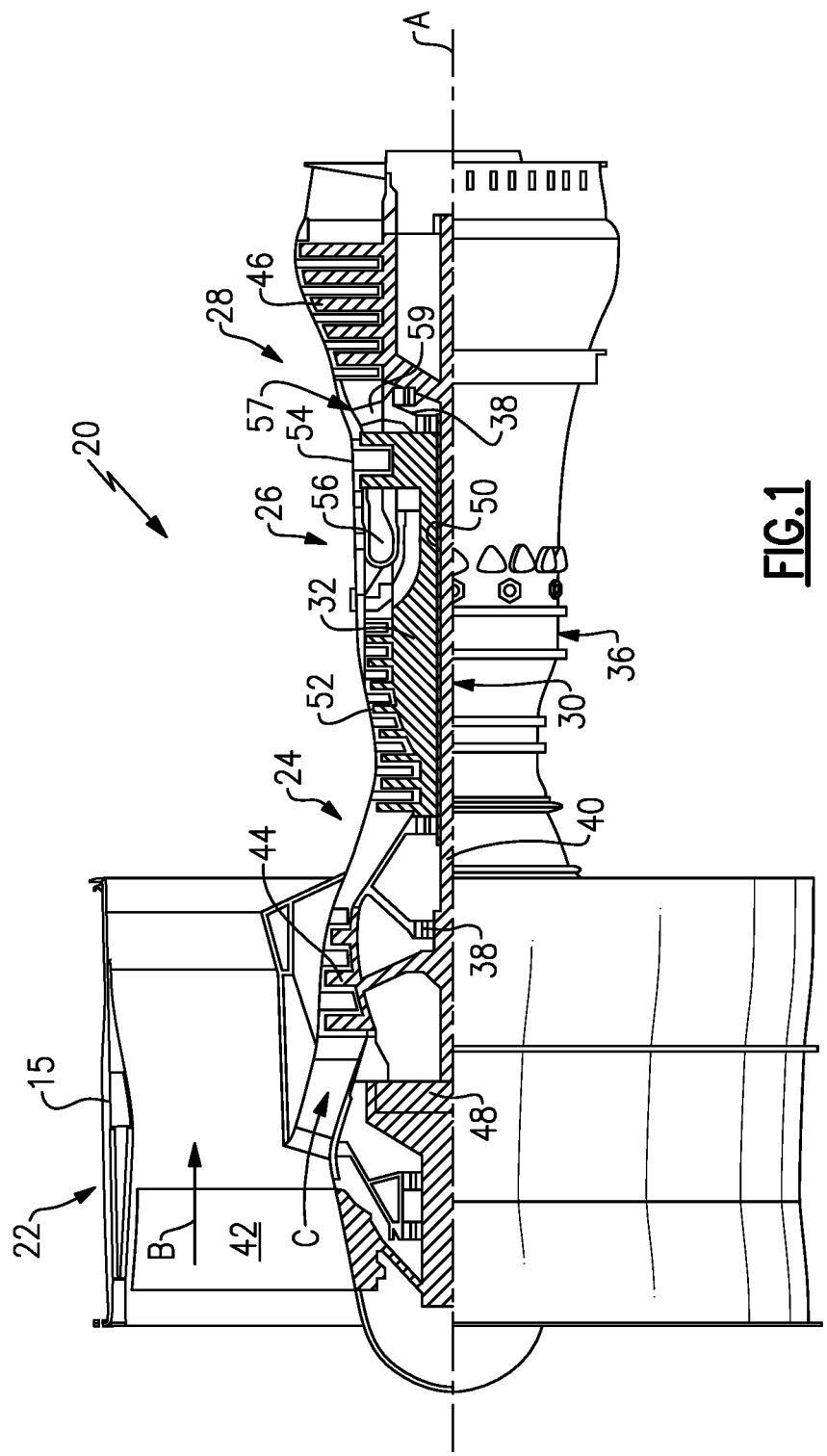
FIG. 1 an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2A:
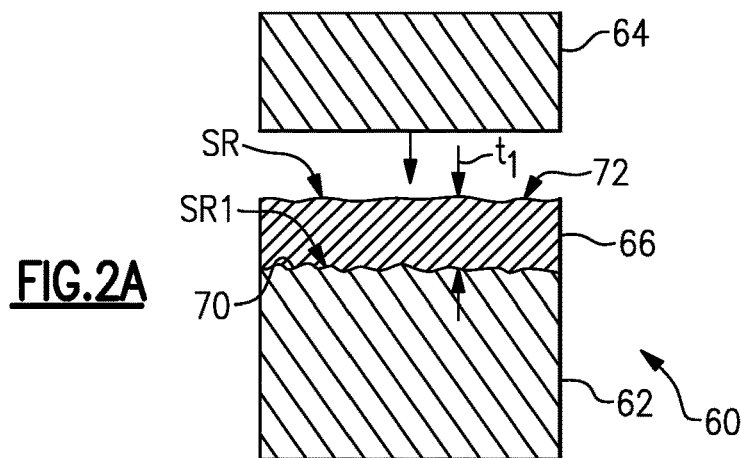
FIG. 2A illustrates portions of an example seal system.

FIG. 2A illustrates a sectioned view of a representative portion of a seal system 60 of the engine 20. As examples, the seal system 60 may be implemented in the turbine section 28 in association with a turbine vane, a turbine blade, or a blade outer air seal, or in other components in the engine 20 that are exposed to high temperatures, such as the combustor section 26. The seal system 60 includes a ceramic component 62 and a metallic component 64, which is formed of a superalloy such as a nickel- or cobalt-based superalloy. As will be appreciated, FIG. 2A is representative and the actual geometry of the components will vary depending on the particular implementation. In one example, the metallic component 64 is a feather seal, which is a thin, generally uniform thickness strip of metal. It is to be understood, however, that the metallic component 64 can alternatively be a component other than a feather seal, such as an adjacent component that serves other functions in addition to sealing.

The ceramic component 62 is formed of a monolithic ceramic, a ceramic matrix composite (CMC), or a combination of monolithic ceramic and CMC. The monolithic ceramic may be, but is not limited to, silicon nitride or silicon carbide. A CMC has ceramic fiber tows that are disposed in a ceramic matrix. The CMC may be, but is not limited to, a SiC/SiC CMC in which SiC fiber tows are disposed within a SiC matrix. A fiber tow is a bundle of filaments. As an example, a single tow may have several thousand filaments. The tows may be arranged in a fiber architecture, which refers to an ordered arrangement of the tows relative to one another, such as, but not limited to, a 2D woven ply or a 3D structure.

The ceramic component 62 includes a surface region 70, which is a surface area of the ceramic component 62 at which the CMC component 62 seals with the metallic component 64. Most typically, this will be on the backside of the ceramic component 62 rather than facing into in the core gaspath C of the engine 20. The surface region 70 defines a first surface roughness SR1. As used herein, surface roughness refers to surface roughness Ra (typically in micrometers). Surface roughness Ra can be measured using known profilometer or structured light scan equipment and methods. For a CMC, although the fiber tows are embedded in the matrix, the matrix may not completely smooth over the fiber tows. As a result, in comparison to surfaces of metallic components, the surface of a CMC is relatively rough and "wavy" from protrusion of the tows. A monolithic ceramic may not be as rough or wavy as a CMC but still has a relatively rough surface in comparison to metallic components. This roughness, represented by the first surface roughness SR1, presents a challenge to sealing because a mating seal, e.g., the metallic component 64, does not conform to the surface roughness, thereby leaving small gaps that may provide pathways for leakage.

In this regard, as shown in FIG. 2A, a silicon-containing layer 66 is provided on the first surface region 70 and serves to fill-in the roughness and thereby somewhat smooth the CMC. In one example, the silicon-containing layer 66 is pure or substantially pure silicon. The silicon-containing layer 66 is deposited by known deposition techniques, such as but not limited to thermal spraying. The surface 72 of the silicon-containing layer 66 has a surface roughness SR that is less than the first surface roughness SR1. For example, the surface roughness SR1 is greater than 800 Ra and the surface roughness SR is less than 200 Ra. Thus, the silicon-containing layer 66 in essence serves to provide a reduction in roughness of at least 75%. Some roughness is desired in order to promote mechanical bonding with later-applied barrier layer 68. In general, the silicon-containing layer 66 has a thickness t1 up to about 1500 micrometers, such as 10 micrometers or 25 micrometers. The thickness t1 may be selected in accordance with the desired adherence with the ceramic component 62 as well as the total thickness of all coating layers in the region of sealing and flow path geometry.

While the top surface 72 of the silicon-containing layer 66 is somewhat smooth, if the metal of the metallic component 64 were to be in direct contact with silicon of the silicon-containing layer 66, the silicon may migrate and intermix with elements of the metallic component 64, such as nickel or cobalt, to form relatively low melting temperature eutectic phases. For instance, Ni—Si and Co—Si eutectic phases begin at around 965° C. and 1193° C., respectively. The melting temperatures of these eutectic phases are generally lower than the melting temperature of the superalloy of the metallic component 64. Therefore, eutectic formation may reduce thermal stability and durability.

Figure 2B:
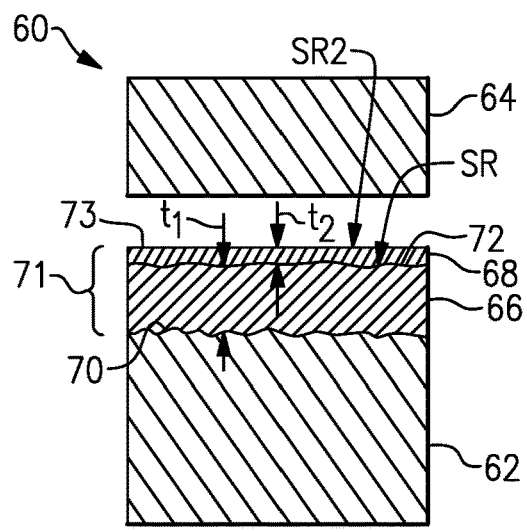
FIG. 2B illustrates an example seal system (in a non-sealed state) that has a silicon layer and a barrier layer.

In this regard, as shown in FIG. 2B a barrier layer 68 is provided on the silicon-containing layer 66 to limit or stop interaction between the silicon of the silicon containing layer 66 and the elements of the metallic component 64. The silicon-containing layer 66 and the barrier layer 68 are collectively considered to be a coating system 71. The silicon-containing layer 66 also serves as a bond coating for the overlying barrier layer 68. The silicon-containing layer 66 strongly bonds with the ceramic component 62 and thus makes for a compatible surface for adhering oxide coatings.

Figure 2C:
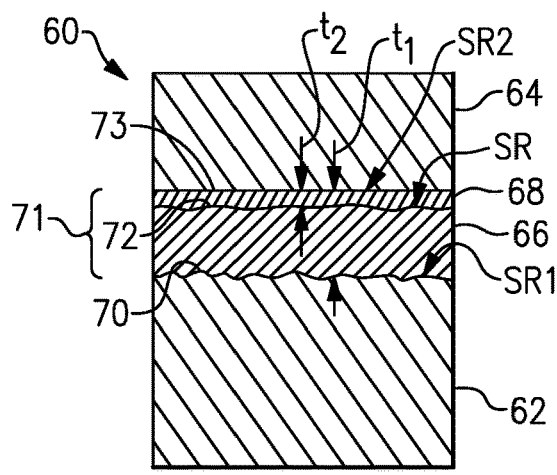
FIG. 2C illustrates the seal system of FIG. 2B but in a sealed state.

The barrier layer 68 is a layer of at least one of mullite ($3Al_2O_3$-$2SiO_2$), zircon ($ZrSiO_4$), or hafnon ($HfSiO_4$). Mullite is stable in contact with CMCs and superalloys at temperatures up to about 1371° C. That is, mullite is inert with respect to chemical interaction with the CMC and superalloy. Zircon and hafnon are stable in contact with CMCs and superalloys at temperatures beyond 1204° C. In deposition of the barrier layer 68 onto the ceramic component 62, the surface 72 of the silicon-containing layer 66 serves as a template to apply the barrier layer 68. Surface 73 of barrier layer 68 is machined and/or polished, such as by milling, grinding, or ultrasonic impact machining, to desired surface roughness SR2, as long as the machining/polishing does not expose the underlying silicon. As an example, the barrier layer 68 has a thickness t2 of 10 to 1500 micrometers before machining/polishing, which leaves a sufficient thickness of material that can be removed in order to achieve a desired surface roughness SR2 and also meet dimensional requirements of the flow path geometry. FIG. 2B illustrates the system 60 prior to sealing between the metallic component 64 and the ceramic component 62, and FIG. 2C illustrates the system 60 in a sealed state.

In one example, the barrier layer 68 is deposited by plasma spray or other known technique and is then machined to the final desired thickness t2 and surface roughness SR2. For example, the surface roughness SR2 is less than 100 Ra. In general, the final thickness t2 is less than the thickness t1 of the silicon-containing layer 66. The relatively thin barrier layer 68 in comparison to the silicon-containing layer 66 facilitates reducing internal stress in the barrier layer 68. Such stresses can cause distress and coating loss. Therefore, reducing stresses facilitates increasing durability. The thickness t1 of the silicon-containing layer 66 can be greater than t2 because silicon is more stress-tolerant in comparison to the ceramic of the barrier layer 68. Moreover, the low thickness t2 and the corresponding lower stresses may enable use of higher densities of the ceramic, which is better for machinability.

Figure 3:
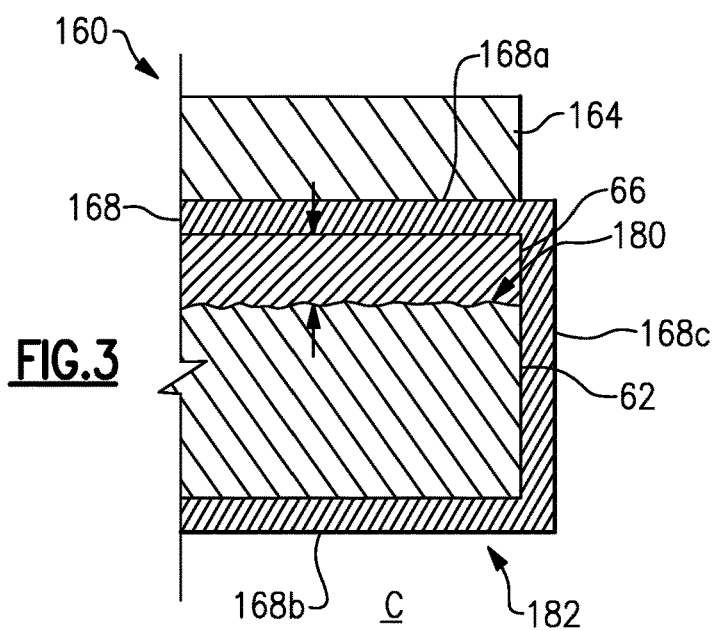
FIG. 3 illustrates another example seal system in which the barrier layer also serves as an environmental barrier.

FIG. 3 illustrates another example seal system 160. In this disclosure, like reference numerals designate like elements where appropriate and reference numerals with the addition of one-hundred or multiples thereof designate modified elements that are understood to incorporate the same features and benefits of the corresponding elements. The ceramic component 62 is situated such that it has a non-core-gaspath region 180 that faces away from core gaspath C and a core-gaspath region 182 that faces into and bounds the core gaspath C.

In this example, the barrier layer 168 includes a first section 168a on the silicon-containing layer 66, a second section 168b, and an intermediate section 168c that connects the first and second sections 168a/168b. The first section 168a serves as a barrier to silicon from the silicon-containing layer 66 interacting with the metallic component 164, as discussed above, but the barrier layer 168 also continuously extends around at least a portion of the ceramic component 62 such that the second section 168b serves as an environmental barrier layer at the core-gaspath region 182. In this regard, the mullite, zircon, or hafnon serve to block environmental attack from moist hot gases.

Silicon-based ceramic matrix composites ("CMC") or monolithic ceramics are desirable in high temperature components in the engine 20 due to their temperature capability and low density. Components such as CMC or monolithic ceramic vanes, blades, and blade outer air seals are segmented circumferentially, and typically multiple parts make up a given row. The intersegment or mate-face gaps between these parts must be sealed in order to reduce exposure of metallic hardware to hot gas-path air ingestion. In these regards, the seal systems here may be implemented pursuant to such purposes and to control leakage of secondary airflow, which may otherwise debit engine performance.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal system comprising:
a ceramic component having a surface region defining a first surface roughness;
a metallic component situated adjacent the surface region; and
a coating system disposed on the surface region, the coating system including a silicon-containing layer on the surface region and a barrier layer on the silicon-containing layer, the silicon-containing layer having a surface in contact with the barrier layer, the barrier layer having a surface in contact with the metallic component, the surface of the barrier layer having a second surface roughness that is less than the first surface roughness, the barrier layer limiting interaction between silicon of the silicon-containing layer and elements of the metallic component, and the barrier layer including at least one of mullite, zircon, or hafnon.

2. The seal system as recited in claim 1, wherein the barrier layer is selected from the group consisting of mullite, zircon, and hafnon, and the metallic component is a nickel- or cobalt-based superalloy.

3. The seal system as recited in claim 2, wherein the barrier layer is mullite.

4. The seal system as recited in claim 2, wherein the barrier layer is zircon.

5. The seal system as recited in claim 2, wherein the barrier layer is hafnon.

6. The seal system as recited in claim 2, wherein the silicon-containing layer is silicon.

7. The seal system as recited in claim 1, wherein the silicon-containing layer is silicon.

8. A gas turbine engine comprising:
a compressor section;
a combustor in fluid communication with the compressor section; and
a turbine section in fluid communication with the combustor, and at least one sealing system in the turbine section or the combustor, the sealing system including:
a ceramic component having a surface region defining a first surface roughness,
a metallic component situated adjacent the surface region, and
a coating system disposed on the surface region, the coating system including a silicon-containing layer on the surface region and a barrier layer on the silicon-containing layer and in contact with the metallic component, the silicon-containing layer having a surface in contact with the barrier layer, the barrier layer having a surface in contact with the metallic component, the surface of the barrier layer having a second surface roughness that is less than the first surface roughness, the barrier layer limiting interaction between silicon of the silicon-containing layer and elements of the metallic component, and the barrier layer including at least one of mullite, zircon, or hafnon.

9. The gas turbine engine as recited in claim 8, wherein the barrier layer is selected from the group consisting of mullite, zircon, and hafnon, and the metallic component is a nickel- or cobalt-based superalloy.

10. The gas turbine engine as recited in claim 9, wherein the barrier layer is mullite.

11. The gas turbine engine as recited in claim 9, wherein the barrier layer is zircon.

12. The gas turbine engine as recited in claim 9, wherein the barrier layer is hafnon.

13. The gas turbine engine as recited in claim 9, wherein the silicon-containing layer is silicon.

14. The gas turbine engine as recited in claim 8, wherein the silicon-containing layer is silicon.

\* \* \* \* \*